United States Patent [19]

Munyan

[11] Patent Number: 5,761,485
[45] Date of Patent: Jun. 2, 1998

[54] PERSONAL ELECTRONIC BOOK SYSTEM

[76] Inventor: Daniel E. Munyan, 805 Mt. Gretna Rd., Elizabethtown, Pa. 17022

[21] Appl. No.: 565,915

[22] Filed: Dec. 1, 1995

[51] Int. Cl.[6] .................. G06F 15/02; G06F 17/40; G09G 1/02
[52] U.S. Cl. .................. 395/500; 345/901; 326/8; 395/187.01; 455/411
[58] Field of Search .................. 395/2.69, 500, 395/145, 2.82, 186, 187.01, 188.01, 200.09, 650; 455/89; 379/98, 368, 58; 348/134; 382/14, 56; 345/192, 127, 130, 901; 434/317; 326/8; 364/286.4, 286.5, 949.81, 260; 365/185.04; 462/903; 463/29; 902/4

[56] References Cited

U.S. PATENT DOCUMENTS

| | | |
|---|---|---|
| 3,718,906 | 2/1973 | Lighter . |
| 4,159,417 | 6/1979 | Rubincam . |
| 4,545,023 | 10/1985 | Mizzi . |
| 4,649,499 | 3/1987 | Sutton et al. . |
| 4,682,161 | 7/1987 | Bugg . |
| 4,763,356 | 8/1988 | Day, Jr. et al. .................. 379/368 |

(List continued on next page.)

FOREIGN PATENT DOCUMENTS

| | | |
|---|---|---|
| 2149544 | 6/1985 | United Kingdom . |
| WO 87/01481 | 3/1987 | WIPO . |

OTHER PUBLICATIONS

Bryant ("The electronic book–a user's wishlist", IEE Colloquium on 'Human–Computer Interface Design for Multimedia Electronic Books', pp. 9/1–9/3, Jan. 1, 1995).

Miyazawa et al. ("An Electronic Book: APTBook", Human–Computer Interaction—Interact '90, Proceedings of the IFIP TC 13 Third International Conference, 1 Jan. 1990, pp. 513–519).

(List continued on next page.)

*Primary Examiner*—Emanuel Todd Voeltz
*Assistant Examiner*—Phallaka Kik
*Attorney, Agent, or Firm*—Earl F. Clifford; Clifford & Clifford Law Firm

[57] ABSTRACT

The Personal Electronic Book System invention replaces a standard handheld book with an electronic equivalent. The invention is sized and configured to be book size and to open like a book for use. When opened, the user sees two facing page-like touch-sensitive, display screens with black print on white background. Icons represent the electronically stored material, "artwork, audio clips, books, E-mail, faxes, games, magazines, movies, musical compositions, newspapers, photographs, software, video clips, etc.", which are selected by touching the icon. When a book, magazine, newspaper, or the like is selected, its table of contents is displayed and the user can then read page by page or go directly to a particular page by touching the selection listed in the table of contents. Closing the Personal Electronic Book automatically shuts down the device. Touching a page number before closing the Personal Electronic Book inserts a bookmark so that when the Personal Electronic Book is re-opened, the user is returned to the same page. New printed or multimedia material can be downloaded from an remote server, that is, "a bookstore," and old material, books read, etc., can be deleted to make room for the new material.

21 Claims, 2 Drawing Sheets

U.S. PATENT DOCUMENTS

| | | | |
|---|---|---|---|
| 4,855,725 | 8/1989 | Fernandez . | |
| 4,918,632 | 4/1990 | York . | |
| 5,031,119 | 7/1991 | Dulaney et al. . | |
| 5,105,468 | 4/1992 | Guyon et al. | 382/14 |
| 5,109,354 | 4/1992 | Yamashita et al. . | |
| 5,146,552 | 9/1992 | Cassorla et al. | 395/145 |
| 5,267,334 | 11/1993 | Normille et al. | 382/56 |
| 5,291,598 | 3/1994 | Grundy | 395/650 |
| 5,333,152 | 7/1994 | Wilber | 379/98 |
| 5,339,091 | 8/1994 | Yamazaki et al. . | |
| 5,379,057 | 1/1995 | Clough et al. . | |
| 5,410,326 | 4/1995 | Goldstein | 348/134 |
| 5,465,401 | 11/1995 | Thompson | 455/89 |
| 5,500,991 | 3/1996 | Luther | 395/2.69 |
| 5,561,705 | 10/1996 | Allard et al. | 379/58 |

OTHER PUBLICATIONS

Keates et al. ("Copyright protection of artistic materials in electronic form: the CITED approach", Information Services & Use, vol. 13, No. 4, Jan. 1993, pp. 389–398).

Brownrigg et al. ("An Electronic Library Communications Format: A Definition and Development Proposal for MARC III", Library Hi Tech, vol. 8, No. 3, Jan. 1990, pp. 21–26).

Bryant ("The paperless book", IEE Review, vol. 41, Issue 6, 16 Nov. 1995, pp. 245–247).

Gray ("Evolution of Data Management", Computer Magazine, vol. 29, Issue 10, Oct. 1996, pp. 38–46).

Pobiak ("Adjustable access electronic books", IEEE Comput. Soc. Press, Proceedings of the Johns Hopkins National Search for Computing Applications to Assist Persons with Disabilities, 1 Feb. 1992, pp. 90–94).

Carey et al. ("Towards heterogeneous multimedia information systems: the Garlic approach", IEEE Comput. Soc. Press, Proceedings RIDE–DOM '95: Fifth International Workshop on Research Issues in Data Engineering–Distributed Object Management, 6 Mar. 1995.

PERSONAL ELECTRONIC BOOK SYSTEM

BACKGROUND OF THE INVENTION

1. Field of the Invention

The present invention relates to information and multimedia storage and display systems and specifically to paperless books, personal electronic books, personal electronic communicators and readers, personal electronic message communicators, personal electronic facsimile communicators, on-line computer database communicators, and downloadable computer database products such as artwork, audio clips, books, E-mail, faxes, games, magazines, movies, musical compositions, newspapers, photographs, software and video clips.

2. Description of the Prior Art

Vast amounts of printed material are widely distributed in the form of printed books, magazines and newspapers. These traditional media are printed on paper with a page printed on each side of the paper so that when reading a book, magazine or newspaper, two pages of printed material are exposed to the reader. These printed materials consume vast quantities of paper and also shipping resources to transport them to bookstores or newsstands for sale to the ultimate consumer, to libraries or to warehouses for storage. In recent years, virtually all commercially printed media are printed from computer-based databases and yet these same databases are only slowly becoming available to users of personal computers (PC). Even with the availability of book-like material displayed in page format on the PC, consumers have shown a very low acceptance level to reading from a computer screen. Readers want to hold and cradle the item they are reading, view entire pages at once, and look down at their reading material.

Newspapers and magazines spend about 100 million dollars a year producing electronic editions of their publications. More than 120 newspapers currently offer electronic editions. Dozens of magazines covering a diversity of subjects are available in electronic editions. The Wall Street Journal reported that an April, 1995 survey of 650 newspapers indicated that 12 percent of these are already offering on-line electronic editions and that 40 more newspapers expect to offer electronic editions by the end of 1995. A major deficiency of electronic editions of newspapers and magazines is that these editions typically bear little resemblance to the printed publications especially in terms of graphics, page layout and typography.

With the accessibility and ready availability of the PC, accessing information stored in computer databases and in multimedia formats has transcended the computer mainframe and has been popularized in various media now available to the PC. As yet, this information and multimedia explosion has failed to deliver a personal, dedicated electronic device that is as easy to use or even as desirable to use as the common book, printed on paper and bound in a soft or hard cover. The present invention provides a personal, portable electronic book that overcomes these deficiencies.

The prior art which may be relevant to this invention is described hereinafter.

U.S. Pat. No. 3,718,906 to Lightner discloses a method and apparatus for a computer controlled host to transmit customer selected sound (or video) recordings stored on constantly running endless master tapes over AT&T's picturephone telephone lines to remote vending machines where the sound recordings are recorded onto cassettes and delivered to the customer. This disclosure describes dialing into a remote computer-controlled storage facility and ordering the transmission of stored information such as sound or video recordings to a remote device where the information is duplicated onto a tape cassette and paid for by the customer.

U.S. Pat. No. 4,159,417 to Rubincam discloses a portable, battery powered electronic viewer that reads and displays data stored in a holographic memory card. The memory can be page oriented so that each hologram represents a page in a book and the entire book can be stored on one card. An alternative embodiment provides a book-sized container hinged like a book so that 2 opposing displays can be read in a manner similar to the reading of a book. The device incorporates controls for controlling pagination, for adjusting the speed of leafing through the book and for displaying and entering page numbers. This disclosure describes facing displays mounted in a hinged book-sized device with plug-in memory card storage for a single book and functions that provide page control.

U.S. Pat. No. 4,545,023 to Mizzi discloses a handheld, battery-powered computer comprising various electronic cards and a flat touchscreen. The touchscreen eliminates the need for a keyboard or other input keypads. The screen can display alphanumeric characters and graphics. Any area touched on the screen is identified by its coordinates. The device can be connected to a remote host computer via an acoustic coupler and a telephone line. The device can be adapted for particular uses such as hand-writing recognition or TV or radio receiving by plugging in special purpose electronic cards. This disclosure describes a battery-powered, handheld computer that uses a large, flat touchscreen display to replace a mechanical keyboard and that has the facilities to communicate with a remote host over telephone lines.

U.S. Pat. No. 4,649,499 to Sutton et al. discloses computer programs designed to emulate a three dimensional object such as a rotary card file or a hand calculator on a computer touchscreen. Functions are performed by touching appropriate symbols on the touchscreen, for example, a knob to rotate the cards, a tab label to select and view a card, plus softkeys to perform other functions on the cards. An emulation that puts up a functional calculator touchscreen display is also disclosed. This disclosure describes the interaction between a touchscreen and the operation of a computer and software to present a display of information with softkey areas that are used to provide user control of the associated information or function.

U.S. Pat. No. 4,682,161 to Bugg discloses a video display terminal connected via a modem over a telephone line to a remote source for the purpose of acquiring and transmitting information. This disclosure describes the logic circuits used to transfer digital codes to the terminal so that the data can be displayed on a raster scan display device in either normal or enlarged character size. This disclosure describes communicating over a telephone line via modem and transferring data to be displayed on a screen.

U.S. Pat. No. 4,855,725 to Fernandez discloses a simulated book that uses a battery-powered microprocessor with ROM for the program and RAM storage for data and a large LCD screen to display up to 2 pages of information transmitted from a CD-ROM equipped PC over an attached infrared transceiver to a transceiver incorporated into the simulated book. The book uses a touchscreen to display the data and to control paging through the material. The device automatically requests additional pages of information to be transmitted from the PC for storage in the book. The book can be taken with you for latter reading. Data storage is maintained by a battery powered RAM. An alternative version disclosed includes a keypad and a tactile pad switch for inputting requests for a particular page or to page forward or backward. The book displays a single page at a time with the program automatically requesting pages of information to be transmitted from the PC to the book on the fly as the user reads or pages through the book.

U.S. Pat. No. 4,918,632 to York discloses a battery-powered, portable touchscreen computer designed with a multitude of holes along one edge so that the computer can be transported in a 3-ring binder or the like.

U.S. Pat. No. 5,031,119 to Dulaney et al. discloses a handheld, keyboardless computer with a split liquid crystal display (LCD) screen, the top half of the screen displays an application and the bottom half displays a keyboard. A glass overlay with an electrically-conductive coating interacts with an electrically conductive pen so that the user can input keystrokes on the bottom half of the screen or use the pen to perform mouse-like functions on the top half.

U.S. Pat. No. 5,109,354 to Yamashita et al., discloses a portable pocketbook device comprising a touchscreen or pressure sensitive LCD display, a cursor, function keys and an on/off switch that is activated when the pocketbook device is opened. A hinged binding contains a battery pack and rings to hold expansion cards. A back cover contains the electronics and a power source. Multiple methods of communicating between the expansion cards and the pocketbook include fiber optics, LED links and electromagnetic induction along the rings. The screen can be touch sensitive or the unit can be setup with a pressure sensitive screen for hand writing recognition. The expansion cards provide the capability of adding and removing a plurality of databases.

U.S. Pat. No. 5,339,091 to Yamazaki et al. discloses a portable electronic book comprised of a LCD display, key-button inputs or other external input facilities, an on/off switch activated by opening the cover, a hinged cover, a solar cell in the cover to power the unit, a connector for an external power source and a disk drive to read information from optical or floppy disks. Other memory devices could include magnetic tape and EPROMS. The screen incorporates pressure or photo sensors so the user can select and emphasize portions of the text for latter recall.

U.S. Pat. No. 5,379,057 to Clough et al. discloses a portable, self-contained general-purpose, keyboardless computer that uses a touchscreen display for data entry. The touchscreen is superimposed over a color-graphics LCD-type display. The computer includes memory to store a data collection application and libraries of possible user responses for display in text or pictogram form. The user then touches the area displaying the text or pictogram to select the proper response. The disclosed computer is battery or AC powered and equipped with a serial I/O communications port for connecting to a modem or for other serial communications to a host computer. The portable computer communicates with the host computer to download selected applications and associated libraries. The user can also enter information to identify the user and to personalize the database created.

Great Britain Patent No. GB 2,149,544A to Crossland et al. discloses an electronic book that can display a page of text or illustrations and can increase type size for easier reading by the partially sighted. This device comprises a LCD-type matrix display, a memory unit that holds the material to be displayed, a telecommunications port, a microprocessor controller and a battery power supply and charger. The display has a black on white contrast approaching that of print on paper. Data storage can be a microcassette mounted on the back of the display unit, a cartridge or disk that plugs into the back of the book or an external source. The telecommunications port provides the capability to download materials from a central database such as an electronic newspaper or service repair information. User functions include page forward and backward, search for a specific page number, fast rewind, browse forward or backward, split screen for a simultaneous 2-page display and word search. The current page of information can be held in RAM to serve as a bookmark feature.

PCT International Pat. No. WO 87/01481 to Stein discloses a portable device in the shape of a book that reads data via a laser from a credit card sized data card or from other storage media. This electronic book has opposing displays, a card reader from which textual information is transferred onto the display screens, 2 pages at a time, and a battery or AC power source. The device also incorporates user controls to advance or reverse paginate through the book, go to the first page of the book and an automatic bookmark feature. Opening and closing the hinged cover can turn the displays on and off.

The present invention overcomes many of the drawbacks and deficiencies of prior art storage and display devices by providing an easy-to-use, book-like, portable, personal, electronic reader with facing page display capabilities, the capability to display pages in their native printed format and downloadable storage capabilities.

OBJECTS AND SUMMARY OF THE INVENTION

The Personal Electronic Book System invention replaces a standard handheld book with an electronic equivalent. The invention is sized and configured to be book size, to open like a book for use, to display facing pages of printed material in their original "as printed" format, and to have the look and feel of a printed book.

A principle object of the present invention is to provide a portable electronic device that stores and displays many publications within a single unit.

Another object of the present invention is to provide easy and timely accessibility to new publications, new editions and periodicals at a cost less than the printed equivalent.

Still another object of the present invention is to provide an environmentally-friendly paperless means for storing, displaying and reading conventionally printed materials.

A further object of the present invention is to reduce inventory, distribution and printing costs for publishers.

Another object of the present invention is to alleviate the dependence on physical media such as printing on paper for every copy of a publication.

Yet another object of the present invention is to provide publishers a device incorporating a full-page display that allows original printed text, graphics and advertising to be presented in their original page layout and format.

Still another object of the present invention is to provide a dedicated reader manufactured from highly-reliable solid state components and with only a few simple mechanical components.

Another object of the present invention is to provide an electronic device that can automatically access an on-line database service, automatically download selections from this database, and then store these downloaded selections for later display by a user.

Still another object of the present invention is to provide a reusable device that can be used to read and display an unlimited number of printed or multimedia products.

A further object of the present invention is to provide the simplicity of the look and feel of a printed book while allowing access to a large database of printed and multimedia products.

Another object of the present invention is to provide a revolving collection of paperless books that requires only a small amount of physical storage space.

Yet another object of the present invention is to provide a system for distributing printed and multimedia products to consumers.

Still another object of the present invention is to provide a system whereby printed and multimedia products can be made available to users while producing a relatively small number of original products or copies.

Another object of the present invention is to provide a multimedia information storage, transmission and display system that will replace presently existing books, magazines, newspapers, microfilm, computer printouts and other printed media.

Yet another object of the present invention is to provide a display device that would be immediately accepted by a very large number of people especially those with limited or little exposure or training on computers.

Other objects and advantages will be apparent from the following description of the invention, and the novel features of the invention will be particularly pointed out hereinafter in the claims.

BRIEF DESCRIPTION OF THE DRAWINGS

The invention is illustrated in the accompanying drawings in which.

DETAILED DESCRIPTION

The Personal Electronic Book System invention replaces a standard handheld book with an electronic equivalent. The invention is sized and configured to be book size and to open like a book for use. When opened, the user sees two facing page-like touch-sensitive, display screens with black print on a white background. Icons represent the electronically stored material and user-selectable functions. When a book, magazine, newspaper, or the like is selected, its table of contents is displayed and the user can then read page by page or go directly to a particular page by touching the page number of the desired selection as listed in the table of contents. Closing the Personal Electronic Book automatically shuts down the device. Additional "printed" or multimedia material can be downloaded from an remote server, that is, a "bookstore," and old material, books read, etc., can be deleted to make room for the new material. The only input to the Personal Electronic Book invention is via the touch-sensitive display screens and the communications link established with the on-line bookstore.

Figure 1:
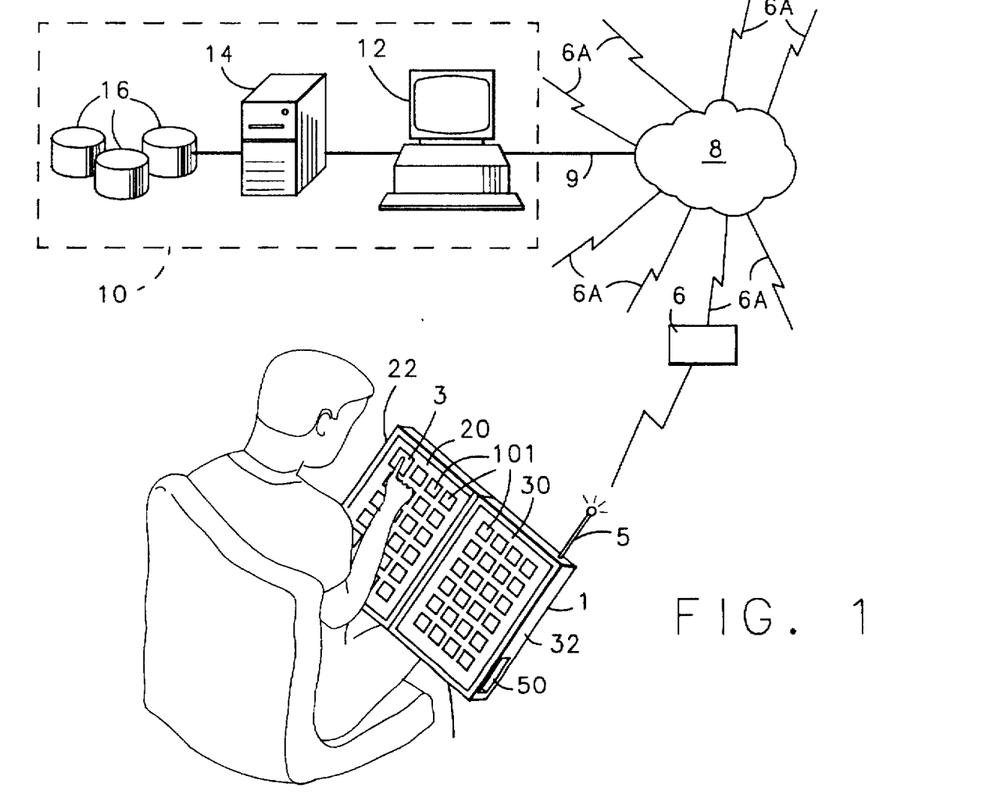
FIG. 1 is a pictorial view showing the elements of the Personal Electronic Book System.
Figure 2:
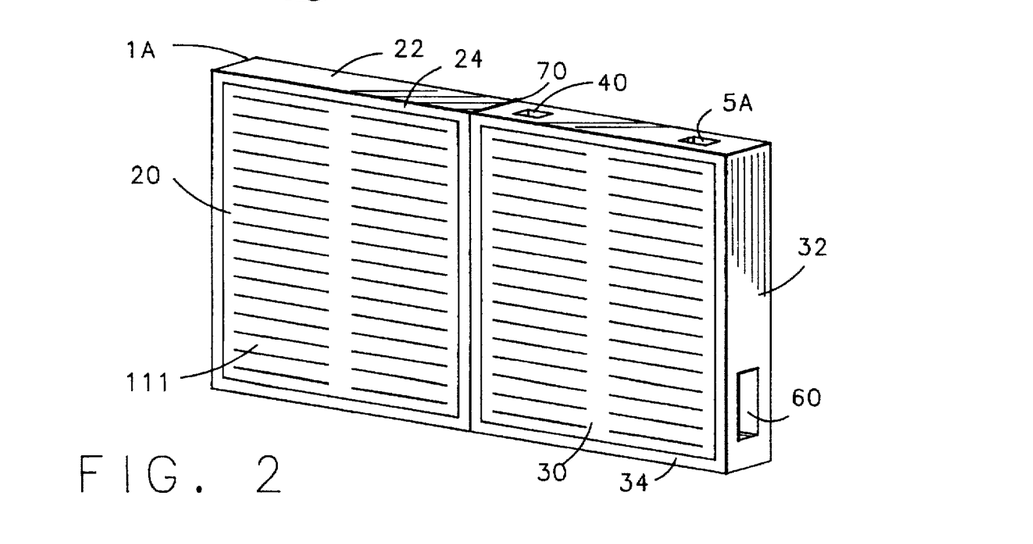
FIG. 2 shows a front pictorial view of the Personal Electronic Book in the open position with facing display screens.

A Personal Electronic Book System comprises a plurality of Personal Electronic Books 1 of FIG. 1 or 1A of FIG. 2, a plurality of communication links 6 and 6A of FIG. 1, a Public Switched Telephone Network (PSTN) 8 of FIG. 1, and an on-line bookstore 10 of FIG. 1. The on-line bookstore comprises:

- a plurality of telephone lines 9 of FIG. 1 from the PSTN to the bookstore 10 of FIG. 1;
- a computer telephony means of connecting, interfacing and answering incoming calls on these telephones lines such as a telephone answering system 12 of FIG. 1, a PSTN gateway, an information on-demand answering system, or the like;
- a processing means for handling user requests and downloading page composition formatted publications (electronic books, magazines, newspapers, journals and the like) and multimedia products such means comprising a server 14 of FIG. 1, a host computer, or the like; and
- a storage means for storing the page composition formatted information and multimedia products such means comprising a plurality of database storage devices 16 of FIG. 1.

Figure 3:
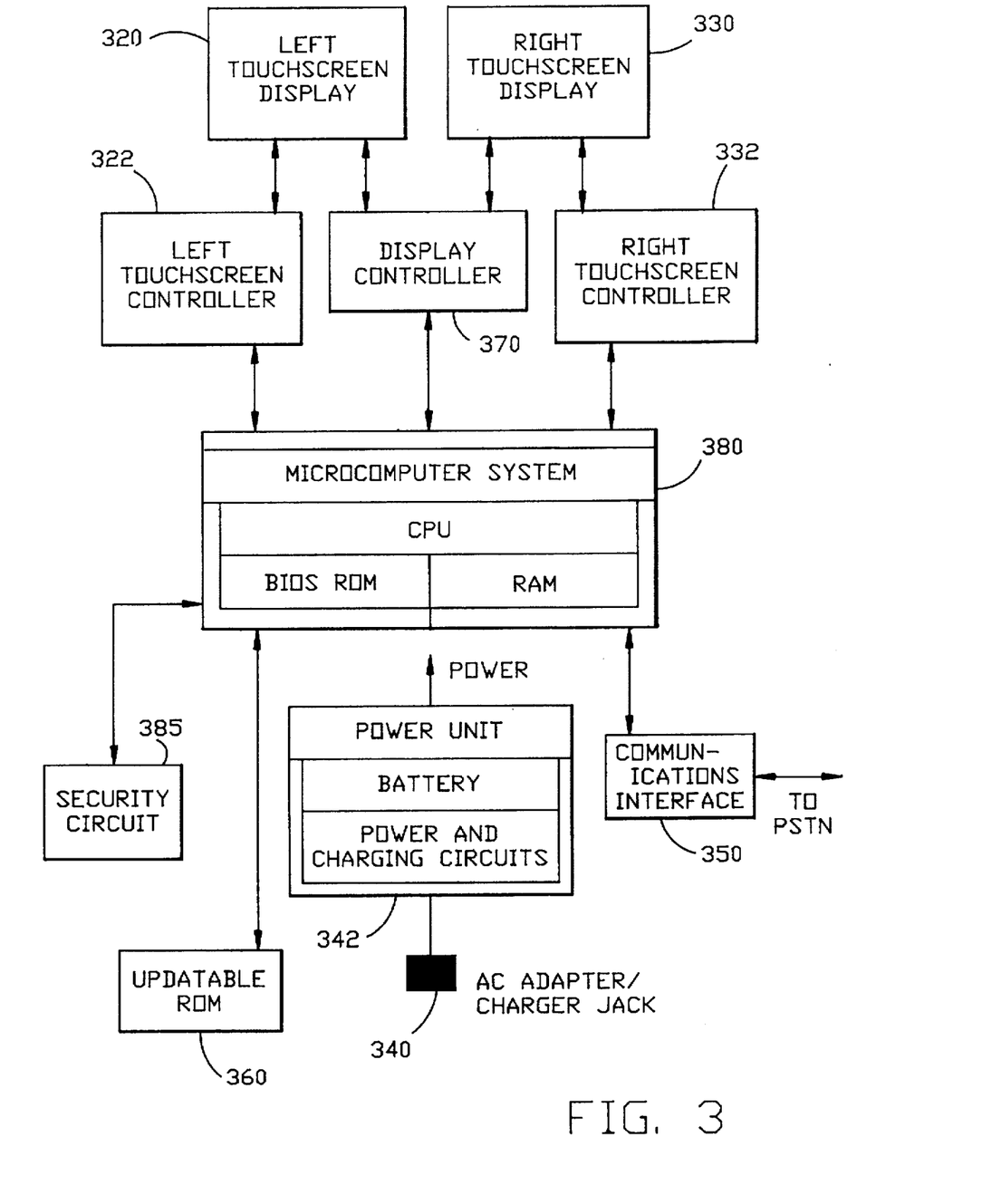
FIG. 3 shows a block diagram of the electronics used in a Personal Electronic Book.

The Personal Electronic Book 1 of FIG. 1 or 1A of FIG. 2 comprises two abutting touch-sensitive display screens 20 and 30 mounted on a pair of peripherally framed, book-shaped, rectangular cases 22 and 32, hinged together so as to open and close in the manner of a printed book, electronic processing means, a communication means, an updateable memory storage means, an internal power unit 342 of FIG. 3 with battery and software means, all configured into a handheld, portable unit. This Personal Electronic Book further comprises:

- a left touchscreen display 20 of FIG. 1 and 2;
- a right touchscreen display 30 of FIG. 1 and 2;
- a left book-shaped, rectangular, front case 22 of FIG. 1 and 2 onto which the left touchscreen display 20 is mounted and retained by a left frame 24 of FIG. 2;
- a right book-shaped, rectangular, back case 32 of FIG. 1 and 2 onto which the right touchscreen display 30 is mounted and retained by a left frame 34 of FIG. 2;
- the communication means to link the Personal Electronic Book to the PSTN such as an internal cellular modem/telephone 5 of FIG. 1, an internal high-speed data modem with a RJ-11 telephone jack 5A of FIG. 2, or the like;
- the updateable memory storage means to store publications of page composited and formatted information (electronic books, magazines, newspapers, journals, and the like), data, user information, multimedia products, and the like, such means comprising a slot 50 of FIG. 1 mounted in the back case for inserting a memory card such as a PCMCIA memory card, or a slot 60 of FIG. 2 mounted in the back case for inserting a removable memory device such as a high-density hard drive, bubble memory, flash memory, or the like, or a plurality of slots mounted in the front and/or rear cases for inserting a plurality of memory storage devices, or the like;
- a connector means to interface an AC adapter/charger device such as the jack 40 of FIG. 2 or an AC adapter/charger jack 340 of FIG. 3;
- a hinge means to mechanically connect the right side of the front case 22 to the left side of the back case 32 as shown at 70 of FIG. 2 so that when the Personal Electronic Book is opened the left and right touchscreen displays abut and present an appearance similar to that of an open printed book;

the electronic processing means to control and monitor the operations of the Personal Electronic Book in accordance with user requests and under software control, said means comprising touchscreen controllers 322 and 332 of FIG. 3 and a display controller 370 of FIG. 3, a microcomputer system 380 of FIG. 3 with random access memory (RAM), a security circuit 385 of FIG. 3, and a power unit 342 of FIG. 3;

the internal power unit 342 of FIG. 3 comprises an internal battery or a plurality of internal batteries and power and charging circuits that interface to an AC adapter/charger unit; and the software means comprises a proprietary operating system embedded in a solid-state device, the BIOS ROM, said software means controlling all the functions of the Personal Electronic Book.

To use the Personal Electronic Book, a user opens the Personal Electronic Book in the same fashion as opening a printed book. This action automatically applies power to the unit and displays facing pages of icons 101 of FIG. 1. Each icon represents a product that has been downloaded to the Personal Electronic Book from the bookstore, preloaded products such as a dictionary, thesaurus, and/or a world atlas, or a function that the user can invoke such as establishing communications with the bookstore. These icons represent the various stored products by displaying graphical/textual images such as a cover page for a printed product such as a book, magazine, newspaper or the like, or a graphical/textual image representative of the various multimedia products available such as an audio or video clip. Alternative embodiments incorporate a user identification code and/or password that must be entered before the Personal Electronic Book can be used.

A bookstore icon 3 of FIG. 1 is provided to automatically initiate and establish communications with the remote bookstore's database library and services. When the user touches this icon 3 of FIG. 1, the Personal Electronic Book requests the user to enter a user identification code and/or a password that will uniquely identify the user to the bookstore and then the Personal Electronic Book uses the build-in communications means to automatically dial out over a telephone link 6 and 6A of FIG. 1 to access the remote on-line bookstore via the PSTN 8. This user identification code and/or password can be the same code or password used to initially active the Personal Electronic Book functions when said code or password is enabled. An alternative embodiment uses a user identification code encoded into a particular Personal Electronic Book when the unit is procured and then only request the user's password for access.

The communications means built into the Personal Electronic Book comprises a cellular modem/telephone 5 of FIG. 1 that communicates with the PSTN 8 via two-way wireless radio waves to a local telephone office or receiving station, thus eliminating the need for a hard-wired connection; or a data modem with RJ-11 telephone jack, or the like, which is connected via a telephone cable to your telephone line and then to the local telephone office; or any modem/telephone interface device that can establish a communications link with the PSTN.

Having established a communication is link to the bookstore 10, the bookstore displays a welcome screen and the various libraries you can access or services available; such as a public domain library, an English language bookstore, a foreign languages bookstore, a multimedia bookstore, and a bookstore subscription services, or the like. Upon entering a bookstore or selecting a service, the product selections can be displayed on your Personal Electronic Book in a multitude of formats.

One such display format is to simulate a bookstore arrangement such as by placing periodicals and newspapers in one section of the display screen such as along the sides of the screen, on-sale items or specials in another section such as across the bottom of the screen, and books and/or other products that may be offered by subject, author, title or other classification in yet another section of the screen. The user touches the various icons or touchscreen sections to bring a particular group of products to the front of the screen, browses through the available products by touching the different items so as to get a description of the product and its price, and then selects the item or items to be downloaded to the Personal Electronic Book. The user confirms their selection by touching a confirmation icon, the items selected are downloaded to the Personal Electronic Book, stored in the updateable ROM storage device, the user's account is billed for the items delivered, and the Personal Electronic Book automatically terminates communications with the bookstore. The Personal Electronic Book then displays icons for any new items along with the icons for other items already stored in.

All items currently stored in the Personal Electronic Book are represented by icons displayed on the facing touchscreen display screens (pages) 101 of FIG. 1 or by textual lists organized by user preference, such as alphabetical, by author, etc. Any item stored in the Personal Electronic Book is accessed by touching its icon or the corresponding item on the list of textual items. Typically, when printed material is accessed, it is displayed as two facing pages with text being displayed in the original fonts and type sizes, black type on a white background, 111 of FIG. 2 or in a color representative of the original publication. Graphics, illustrations, photographs and the like are displayed in color to the extent that the color of the original can be duplicated by the type of display screen used.

To read printed material, the user touches the icon representing the selection to be read. The selection typically opens to a table of contents. The user pages through the material by touching the right corner of the touchscreen to page ahead or touching the left corner to page backward or by touching a Page Ahead icon (or area on the touchscreen) or a Page Back icon (or area on the touchscreen), respectively. New pages are accessed and displayed in a time span generally about the same or faster than the time required to manually turn the page of a printed book, magazine or newspaper. When open to the table of contents page, the user can touch the page number of any chapter or section listed to immediately go to that page. When the user finishes reading, the user can place a bookmark at their current page by touching the page number and then closing the Personal Electronic Book. Otherwise the user merely closes the Personal Electronic Book to turn it off. When the Personal Electronic Book is next opened, if a bookmark was placed, the Personal Electronic Book automatically displays the page so marked and the user can continue to read from the place they stopped. Otherwise the Personal Electronic Book displays the icons representing all currently stored products and functions.

When the user is finished with a stored selection, the user can easily delete this selection to make room for more selections to be downloaded from the bookstore. To delete a selection, the user merely touches a delete icon, touches the icon for the selection to be deleted or touches the item when presented in a textual list and then touches a confirmation icon. The Personal Electronic Book then deletes the selection and thus frees up memory storage.

Instead of deleting selections, the user can save downloaded selections to a memory card and then swap memory cards by removing the memory card currently installed in slot 50 or 60 and then inserting another memory card in its place. In this fashion, the user can build a personal library of their favorite publications and/or multimedia products.

Alternative embodiments of the Personal Electronic Book include enhancements such as touch selecting passages of material and then storing these selections for latter recall, using a stylus or a touch keyboard to create margin notes that can be saved and then retrieved with the annotated document, or entering information into forms, said information then be stored for latter display, retrieval or transmittal to the on-line bookstore or to a printer. Information can also be selected from various documents and saved to a user created document. The information in this document can be rearranged by the user, annotated, modified and saved for the user's personal, educational or business use.

Embodiments of the Personal Electronic Book incorporating handwritten or handprinted note capability further comprise handwriting recognition software incorporated into the proprietary operating system. User input via one of the touchscreens is analyzed and converted into digital characters that are displayed for confirmation, a keyboard, or the like, can be displayed to enter corrections and then the annotation saved upon user command. Alternatively, Graphical software capabilities are added to the proprietary operating system that interprets the user's handwriting as a graphical image, stores this graphical image, and the displays this image along with the annotated document or in a user-created document.

A list function icon appears on the outside corner of each page. This icon enables a user to select another stored selection and go directly to this selection. For example, touching the list icon on the left corner could display a list of books stored while touching the right corner list icon could display a list of magazines available. These lists can be displayed in alphabetical order by title, by author or by subject. The user could access and display a different book, magazine or the like by selecting the item from the list.

The bookstore 10 is an on-line, electronic archive of multimedia products and electronic page composition formatted publications (electronic books, magazines, newspapers, journals and the like) encoded and stored so that when displayed on the Personal Electronic Book these publications maintain the same visual format as printed material. These materials are downloading via the PSTN to a communications means integral to the Personal Electronic Book. Users can display, browse, select, buy (a license to display and use the downloaded products on an Personal Electronic Book), download selections to their Personal Electronic Book and then display and view or read printed selections or run the multimedia products. Downloaded selections are sent in compressed formatted, stored in the Personal Electronic Book and then automatically decompressed.

The printed media bookstore libraries typically comprise a public domain library of selections, an English language bookstore, a foreign languages bookstore, and a subscription section. The user can browse and search any bookstore or section for a desired subject, title, author or publication. Once an item is found, the user can obtain descriptive information about the item and determine its price by touching a price icon. The user then "buys" the item and simultaneously confirms that this item is to be downloaded to the user's Personal Electronic Book by touching the price icon a second time. The bookstore automatically downloads the selection in compressed format to the user's Personal Electronic Book. A downloaded publication can include the publication, the covers and any overleaves. Once downloaded, new icons graphically representing the additional materials stored in the Personal Electronic Book updateable memory storage device are displayed or listed in addition to the material previously stored and not yet deleted.

In an alternative embodiment, bookstore selections can be immediately downloaded or the user can schedule a later time for downloading. For later downloading, the user touches a Download Later icon and then enters the date and time for downloading by touching and adjusting a date and time display presented by the Personal Electronic Book. The Personal Electronic Book then programs or presets this dialup time along with an identification sequence for the item or items to be downloaded into its microcomputer system. The user leaves their Personal Electronic Book connected to a dial-up telephone line via the internal cellular telephone 5 or via the hard-wired telephone connection to the telephone jack 5A, or the like, and at the appointed dialup time, the user's Personal Electronic Book automatically and without user intervention dials up and connects to the bookstore, identifies itself and transmits the identification sequence for the item or items to be downloaded. The bookstore then downloads the requested item(s) to the Personal Electronic Book, the items are stored, and at the completion of the download, the Personal Electronic Book disconnects and turns itself off. This flexibility enables the user to schedule downloading when the Personal Electronic Book is not in active use, during off-peak hours to reduce telephone connect charges, or the like.

When the user accesses the public domain library, only the cost of accessing the bookstore is charged to the user. This cost is displayed in terms of the on-line connect time or an equivalent charge in a message block in a corner of a display screen.

When the user accesses the foreign language bookstore, the selections are displayed in a manner similar to that described for the English-language bookstore. The user first selects a particular foreign language to gain access to the selections available in that language. The user can change the language selected at any time and thus view selections available in other languages.

The bookstore offers a subscription service for Personal Electronic Book users. The user can search for publications based on subject, title, author or publisher or by browsing. When a user subscribes to a particular publication, the bookstore programs a subscription dialup time into the user's Personal Electronic Book that reflects the time that each issue of the subscribed publication becomes available and the time of day that a user wishes to download the subscribed item from the bookstore. The user leaves their Personal Electronic Book connected to a dial-up telephone line via the internal cellular telephone 5 or via the hard-wired telephone connection to the telephone jack 5A, or the like, and at the appointed subscription dialup time, the user's Personal Electronic Book automatically and without user intervention dials up and connects to the bookstore. The bookstore then downloads the subscribed publications to the Personal Electronic Book after which the Personal Electronic Book disconnects and turns itself off. The subscription service includes both English language publications and foreign language publications. The language selection is made in a manner similar to that described for the foreign language bookstore.

Alternative embodiments of the Personal Electronic Book incorporate MPEG 1 and MPEG 2 decoders to provide enhanced motion video displays of video clips or animation sequences such as those used in multimedia and other products.

The peripherally framed front case 22 of FIG. 1 and 2 and back case 32 of FIG. 1 and 2 contain all the external connections to the Personal Electronic Book, mount all the electronic and mechanical components including a rechargeable battery and power and charging circuits and provide the mounting platforms for the abutting touch-sensitive display screens. The external connections comprise connectors for connecting to a telephone line and for connecting to an external AC power adapter/charger or to AC line power when the AC power adapter/charger is incorporated into the Personal Electronic Book electronics. Additional embodiments incorporate a parallel or a serial port for connection to a printer.

The front case 22 and back case 32 comprise a formed aluminum construction with integral cold-flow fasteners and seam welded corner fabrication to provide structural strength and integral electromagnetic interference (EMI) shielding. Machined plastic material comprising the main enclosure shell assemblies with component mounting supports affixed to the inside surfaces are used to mount the internal components of the Personal Electronic Book. This formed aluminum construction is only one of many construction usable; for example: a machined PVC housing, EMI shielding coating on the inside surfaces, and other construction variations are employable.

The peripherally framed cases are joined by a hinge means that enable the cases to be opened and closed like a printed book. The hinge means may comprise a plurality of barrel hinges, for example two to four, a mylar plastic sheet hinge, or the like, that allow the cases to open a full 180 degrees and allow the screens to abut. The Personal Electronic Book cases comprise a front cover case and a back cover case, said front and back cover cases hinged together in a manner that allows relative moment between a closed position in which said cover cases face one another in the manner of the covers of a closed book and an open position in which said cover cases are separated from one another in the manner of an open book.

The Personal Electronic Book can be bound in leather, fabric, vinyl, neoprene or other book binding material to simulate the look and feel of a printed book.

Each touchscreen display screen 20 and 30 of FIG. 1 and 2 is mounted on the upper, inside surface of each case. Each touchscreen display screen extends virtually over the entire face of each case and are electrically connected to the other circuits and components of the Personal Electronic Book. Each touchscreen display screen comprises:

- a display such as a liquid crystal display (LCD) type screen or an active matrix display type screen that employs an array of addressable transistors such as thin-film transistors (TFT) or the like, wherein each color dot or pixel is activated by a group of three transistors, one each for red, green and blue;
- a touch-sensitive transparent plate that covers said screen and is further comprised of resistive touch, capacitive touch, infrared beam touch, or the like, technology.

Although a VGA 640 by 480 pixel resolution LCD or active matrix display provides acceptable detail for text and for some graphics, the preferred display for text, graphics, photographs, video, motion-video clips, and the like, has at least a super VGA 800 by 600 pixel resolution and at least 256 colors.

A typical touchscreen is the thin film transparent plate using resistive touch technology manufactured by Dynapro Corporation. The touch-sensitive transparent plate used in the Personal Electronic Book is typically less than 0.01 inch in thickness. A flexible flat cable is typically used to connect the touch-sensitive transparent plate to its touchscreen controller; although other connections methods are also employable.

The touch-sensitive plate contains a matrix of touch-sensitive areas over its entire surface. The outlines of these areas can be programmed to be recognized to coincide with graphics or other information displayed on the underlying display screen. Various icons, windows, lists of textual items, instructions, functions or even a keyboard can be simulated using the underlying display screen and the touch-sensitive plate thus creating an easy-to-use, user-friendly interface for initiating and establishing communications with the on-line bookstore, for selecting selections stored in the bookstore for downloading or selections stored in the Personal Electronic Book's updateable memory storage device, for user identification, for electronic conversations, for information searches, or the like.

Various keyboard configurations can be displayed oil a single touchscreen display, on part of a touchscreen display, across both touchscreen displays, or portions thereof.

A series of predefined touchscreen areas with underlying icons or softkeys provide the user interface for inputting instructions, for making selections, and for other input from the user. By touching these areas, the user can enter instructions and requests into the Personal Electronic Book. For example, the user can initiate communications with the bookstore by touching the bookstore icon 3 of FIG. 1.

Various embodiments of the Personal Electronic Book comprise differing screen and case sizes to suit the needs of the various traditional printed media sizes. Typical size variations comprise:

- an individual Personal Electronic Book for an individual's day-to-day carry-about and casual use with closed dimensions of about 4.5 inches wide by 6 inches high and open dimensions wherein the two screens lie adjacent to each other of about 9 inches wide and 6 inches high.
- a student Personal Electronic Book sized to display the larger sized pages of printed textbooks with closed dimensions of about 9 inches wide by 12 inches high and open dimensions wherein the two screens lie adjacent to each other of about 18 inches wide and 12 inches high.
- a portfolio Personal Electronic Book for applications requiring the display of large amounts of information especially graphics, illustrations, photographs, or the like, on a single screen with closed dimensions of about 12 inches wide by 15 inches high and open dimensions wherein the two screens lie adjacent to each other of about 24 inches wide and 15 inches high.

In all these embodiments, virtually the entire screen is visible and available for display. Each display can be viewed in a portrait configuration for a single page of material per display screen or the abutting screens can be viewed in a landscape configuration to provide viewable material that spans both display screens. A maximum display surface is available for displaying a page of a printed hardback book or a softback book or so called "pocketbook". A typical hardback textbook page is about 6.5 inch wide by 10 inch high. Of this page, a typical image area is about 5.25 inch wide by 8.5 inch high. A typical softback, pocketbook page is about 4.25 inch wide and 7 inch high. Of this page, a typical image area is about 3.5 inch wide by 6.25 inch high. The various embodiments of the Personal Electronic Book are designed to replace typical softback pocketbooks, hardback books, magazines, and the like.

For large books, magazines, newspapers, and like publications, the two screens can be programmed to display printed material over both screen as if they were a single screen, in either landscape or portrait configuration, thus presenting the impression of reading from a single screen resembling one full page of a magazine or newspaper. For example, two screens of about 9 inches wide by 12 inches high can be turned 90 degrees and viewed as a single screen of about 18 inches high and 12 inches wide.

The relationship between the touchscreen displays, controllers, electronic processing means, communications means, updateable memory storage means, the power unit and external interfaces are shown in FIG. 3. The microcomputer system 380 provides a central processing unit (CPU) to control all operations of the Personal Electronic Book. This microcomputer system 380 comprises the CPU which is controlled by the proprietary operating system embedded in a solid-state device, the BIOS ROM, and random access memory (RAM) that provides the primary memory space to write, store and retrieve information and program instructions used by the CPU. The microcomputer system 380 comprises a general-purpose microprocessor with supporting circuitry such as a logic board with an Intel 486DX2/ 66MHz processor or better, or with a Pentium processor, a PowerPC processor with supporting circuitry such as a 100 MHz 603e processor; a RISC (reduced instruction set configuration) chip with supporting circuitry; or the like.

The Personal Electronic Book is powered from the power unit 342 that comprises one or more rechargeable batteries and power and charging circuits. These power and charging circuits control and distribute battery power or converted AC line power to the Personal Electronic Book components, control the charging of the internal battery or batteries when the Personal Electronic Book is connected to an external AC adapter/charger device via the AC adapter/charger jack 340 and controls switchover between battery power and external AC line power when said AC power is available via the AC adapter/charger device.

The AC power adapter/charger serves a dual function of interfacing the Personal Electronic Book to the AC power line for recharging the internal battery and also for operating the Personal Electronic Book from the AC power line so as to conserve battery power. An alternative embodiment incorporates an internal AC adapter/charger unit that replaces the AC adapter/charger jack 340 with a connector that accepts an AC power cord for direct connection to AC line power. The rechargeable battery comprises a lithium ion battery, a nickel hydride (NiMH) battery, or the like. The rechargeable battery or batteries will power an Personal Electronic Book for a minimum of 3 hours between recharges, although 5 to 8 hours is typical.

When the Personal Electronic Book is opened, power is automatically applied and the microcomputer system 380 automatically loads the proprietary operating system and any prestored settings from previous operations. Typically, the microprocessor system initializes the Personal Electronic Book by displaying the icons for the material stored in the updateable ROM (read only memory) 360 of the memory storage device currently installed in the memory card slot 50 of FIG. 1 or 60 of FIG. 2 and any function icons such as the connect-to-the-bookstore icon. This screen display information is sent from the microcomputer system 380 via display controller 370 to the left touchscreen display 320 and the right touchscreen display 330. The display controller 370 can be a dual-screen graphic controller such as manufactured by Colorgraphic Communications or a separate graphic controller can be provided for each display. Alternatively, the display controller(s) can provide independent, coordinated, or complementary (a single page of material spanning both display screens) display of material across the two display screens.

When the user touches an icon to select and load the desired item or to select a function, such as by touching the bookstore icon 3 of FIG. 1, the touchscreen senses this touch and sends data used to locate the area touched to the left screen controller 322 if the left touchscreen display was touched or to the right touchscreen controller 332 if the right touchscreen display was touched. The touchscreen controller converts the area touched data into coordinate information that is sent to the microcomputer system 380 for processing. Based upon the icon (area) touched, the microcomputer system 380 implements the requested action in accordance with the instructions defined in the proprietary operating system. When the icon touched represents information or products stored in the updateable ROM 360 memory storage device, the microcomputer system 380 accesses this information or product and then displays the information or runs the product.

The updateable ROM 360 memory storage device comprises 500 to 1,000 megabytes or more of memory such as provided by PCMCIA memory storage cards, solid state EEPROMs, flash memory devices, bubble memory, a compact, large-capacity, miniature hard disk drive, or the like. Each embodiment of the Personal Electronic Book has sufficient storage to store several books of textual information in their entirety. The number of publications comprising a combination of text, artwork, photographs and the like and/or multimedia products that can be stored varies depending on the storage requirements of the individual items, the compression techniques used and the amount of memory available in a particular Personal Electronic Book unit.

The communications interface 350 comprises a high-speed modem with a telephone line interface such as provided by an internal data modem connected to a cellular telephone for wireless connection to the PSTN, or an internal data modem connected to a RJ-11 telephone jack and then connected via a telephone wire to a telephone outlet connected to the PSTN, or a PCMCIA slot for a PCMCIA modem that is then connected via a telephone wire to a telephone outlet connected to the PSTN, or the like. Embodiments include a 28.8 or 14.4 K bps internal modem with a telephone line connector, an internal modem directly wired to a retractable standard telephone line terminated with a standard RJ-11 modular telephone jack that the user plugs into a mating telephone line socket, and the like. Modem chip sets for 28.8 K bps are readily available from manufacturers such as AT&T, Rockwell, U.S. Robotics, and the like. Cellular modems incorporating both data modem functions and cellular telephone functions are available from Motorola Corporation and other manufacturers.

A security circuit 385 is incorporated with a unique Personal Electronic Book security identification code that is used in conjunction with the individual owner or user identification code to identify a particular Personal Electronic Book unit to the on-line bookstore, to code each updateable ROM 360 memory storage device to a particular Personal Electronic Book unit so that the data stored in said memory storage device can only be accessed by the Personal Electronic Book unit that downloaded the information or product from the on-line bookstore and to discourage theft of the Personal Electronic Book. The bookstore will terminate communications with an Personal Electronic Book if said user identification code or said security identification code is invalid.

The proprietary operating system controls and manages all operations of the Personal Electronic Book such as accepting user instructions via the user interface (the touch-screen displays), accessing and displaying or running the products stored in the updateable ROM memory storage device, providing book-like functions, automatically accessing, connecting to and downloading products from the on-line bookstore, providing power management to power down the unit after a user-specified time of inactivity, and the like. This operating system can be preloaded onto a BIOS (basic input/output system) chip, preloaded on an EEPROM to facilitate updates to the operating system while the Personal Electronic Book is communicating with the bookstore, or the like.

An enhancement to the Personal Electronic Book invention is the addition of a zoom mode to provide large sized text and images for vision-impaired readers. This zoom mode can be limited to a single magnification, several preset magnifications or it can be continuously variable. The zoom mode can enlarge the displayed image up to several hundred percent of the original size. With textual material, the material enlarged is reformatted by changing line endings so that the enlarged text can be read without scrolling left and right across the display screen. With graphical images, a scroll feature incorporating touchscreen scroll directional arrows enable the vision-impaired reader to view enlarged segments of the graphical material and then smoothly scroll to the adjoining segments of the image.

Another enhancement of the Personal Electronic Book invention is the incorporation of audio output means such as one or more speakers and/or an earphone jack or external speaker jack, audio/sound processing circuits and software to support the sound capabilities of multimedia products, to support text-to-speech (TTS) synthesis to create spoken output based on stored text, to play audio clips, or the like. The sound processing capabilities comprise circuitry and software to support 16-bit Sound Blaster-compatible audio with MIDI support and wavetable or FM synthesis.

The TTS conversion increases the educational value of the Personal Electronic Book by enabling users to learn a language or to learn to read by listening to spoken text as they visually follow the text displayed on the Touchscreen. Software enhancements can increase the effectively of the learning experience by "speaking" each word as the user touches the word on the touchscreen display. Additionally, this capability will provide quicker and better access to information for those with impaired sight since they will not have to wait for a "speaking book" edition to be released.

Yet another enhancement of the Personal Electronic Book is to provide the capability to send one or more page images or selected passages to a printer to a obtain hard copy printout of the selected information. A printer connection is implemented by providing a parallel printer port with associated circuitry and software drivers; or a serial communications port with associated circuitry and software drivers; or an infrared data port with associated circuitry and software drivers to beam pages of information through the air to an infrared equipped printer, or by sending the information via the internal communication means or the Personal Electronic Book to a modem-equipped computer, a facsimile device or a printer equipped with a telephone line interface and modem; or the like.

Many modifications and variations of the Personal Electronic Book system invention may be made without departing from the scope and spirit of the variations set forth herein. As is apparent from the description of the various embodiments wherein common functional elements are shared, these elements are not to be construed in a limiting sense as applying to only a single embodiment.

While only a few embodiments have been illustrated and described, many variations may be made in the design and configuration without departing from the scope of the invention as set forth in the appended claims.

What I claim is:

1. A Personal Electronic Book System wherein a Personal Electronic Book comprising a display, a memory storage means, an identification code, and a communications means; said communications means linking said Personal Electronic Book to a Public Switched Telephone Network (PSTN) and via said PSTN to an on-line bookstore, provides, in combination, for the storage, transmission, reception and display of electronically stored publications, wherein the improvement comprises:

two abutting touch-sensitive display screens wherein each of said display screens can display a full-page of a page composition formatted publication in its original page layout and format;

wherein said abutting touch-sensitive display screens are mounted on a pair of peripherally framed, book-shaped, rectangular cases, hinged together so as to open and close in the manner of a printed book;

a hinge means to mechanically connect the right side of a front case to the left side of a back case, comprising a plurality of hinges so that when the Personal Electronic Book is opened the left and right touchscreen displays abut and present an appearance similar to that of an open printed book;

wherein said communication means comprises a communications interface; said communications interface automatically dialing out over the PSTN to access said on-line bookstore;

an electronic processing means to control and monitor the operations of the Personal Electronic Book in accordance with user requests and for downloading page composition formatted publications;

wherein said identification code is a unique security identification code that is embedded in a security circuit;

said security identification code being used to identify a particular Personal Electronic Book unit to said on-line bookstore;

said security identification code being further used to code said memory storage means to a particular Personal Electronic Book unit so that the page composition formatted information downloaded to and stored in said memory storage means can only be accessed by the Personal Electronic Book unit that downloaded the information from the on-line bookstore;

said memory storage means further comprising a removable, updateable ROM installed in a memory card slot;

wherein said updateable ROM is coded so that the information stored in said updateable ROM can only be accessed by the Personal Electronic Book unit that downloaded the information from the on-line bookstore;

said electronic processing means further comprising touchscreen controllers and a display controller;

an internal power unit comprising an internal rechargeable battery and power and charging circuits that interface to an AC adapter/charger unit;

said power and charging circuits controlling the charging of said internal battery when the Personal Electronic Book is connected to an external AC adapter/charger device via the AC adapter/charger jack and controlling switchover between battery power and external AC line power when said AC power is available via the AC adapter/charger unit; and wherein said Personal Electronic Book (1) is configured into a handheld, portable unit.

2. A Personal Electronic Book System as claimed in claim 1 wherein said on-line bookstore comprises:

a storage means comprising a plurality of database storage devices that store a plurality of multimedia products and electronic page composition formatted publications (electronic books, magazines, newspapers, and journals), said products and publications being encoded and stored so that when displayed on the Personal Electronic Book said products and publications maintain the same printed text, graphics and color as their original printed page layout, format and color;

a database of security identification codes for said plurality of Personal Electronic Books, said database uniquely identifying said unique security identification code of a particular Personal Electronic Book to said bookstore;

processing means to recognize and terminate communications with a Personal Electronic Book that transmits an invalid security identification code;

a plurality of telephone lines connecting said PSTN to said bookstore;

a computer telephony means of connecting, interfacing and answering incoming calls on these telephones lines, comprising a telephone answering system;

a processing means for handling user requests transmitted from said Personal Electronic Books and downloading said publications, comprising a server;

wherein said server downloads selections in compressed format;

said selections being stored in the Personal Electronic Book;

said Personal Electronic Book automatically decompressing said selections for viewing;

said Personal Electronic Book automatically displaying new icons graphically representing said downloaded selections in addition to icons for selections previously stored in said Personal Electronic Book and not yet deleted.

3. Personal Electronic Book as claimed in claim 1 wherein said abutting touch-sensitive display screens comprise a left touchscreen display and a right touchscreen display;

wherein said left and right displays display a single page of material per display screen thus presenting the impression of reading from two facing pages; and wherein said left and right displays display printed matter with at least a super VGA 800 by 600 resolution and with at least 256 colors.

4. A Personal Electronic Book as claimed in claim 1 wherein said removable updateable ROM comprise a plurality of PCMCIA memory cards;

said cards being swapable so that a user of said Personal Electronic Book can build a personal library;

wherein said PCMCIA memory cards are coded so that the information stored in said PCMCIA memory cards can only be accessed by the Personal Electronic Book unit that downloaded the information from the on-line bookstore.

5. A Personal Electronic Book as claimed in claim 1 wherein said updateable ROM comprise a plurality of removable memory devices;

said memory devices being swapable and accessible only by the Personal Electronic Book unit that downloaded the information from the on-line bookstore.

6. A Personal Electronic Book as claimed in claim 1 wherein said abutting touch-sensitive display screens display viewable material that spans both display screens in a landscape configuration so as to resemble one full page of a newspaper, further comprising:

a left touchscreen controller to control and monitor a left touchscreen of said abutting touch-sensitive display screens;

a right touchscreen controller to control and monitor a right touchscreen of said abutting touch-sensitive display screens;

a single display controller to control a left display screen and a right display screen of said abutting touch-sensitive display screens;

said display controller displaying printed matter in a landscape configuration over both displays as if they were a single display thus presenting the impression of reading a single page of material.

7. A Personal Electronic Book as claimed in claim 1 wherein said electronic processing means further comprise software means comprising:

routines to automatically display icons representing stored publications on said abutting touch-sensitive display screens whenever said Personal Electronic Book is opened;

routines to access any stored publication when the icon representing said publication is touched;

routines to automatically decompress stored publication;

routines to display said publication as two facing pages on said abutting touch-sensitive display screens; and routines to display printed text and graphics in their original page layout, format and color.

8. A Personal Electronic Book as claimed in claim 1 wherein said electronic processing means further comprise software means to allow the user to create a document of touch selected passages comprising routines:

to access any stored publication when the icon representing said publication is touched;

to automatically decompress stored publication;

to open said publication and display its table of contents;

to recognize when a user touches a page number in said table of contents and to go to the selected page and display said page;

to display a new page of material whenever a user touches a Page Ahead area on a touchscreen;

to display a previous page of material whenever the user touches a Page Back area on a touchscreen;

to recognize touch selected passages of information in displayed publication;

to store said passages in a user created document;

to create and display an icon for said user created document;

to display said user created document whenever said icon is touched;

to recognize user touch selection of passages within said document so as to move said passages to a new location within said document;

to store said user created document with rearranged passages; and to transmit said user created document to a printer.

9. A Personal Electronic Book System as claimed in claim 2 wherein said Personal Electronic Book comprises routines for unattended downloading of publications, whereby these routines:

accept user entry of a date and time for unattended downloading;

accept user entry of bookstore selections to be downloaded;

at said date and time automatically dials out and connects to said on-line bookstore via said PSTN;

automatically send said unique security identification code;

automatically send a user identification code;

automatically encode said downloaded bookstore selections to said unique security identification code and store said downloaded selections in said updateable ROM so that said selections can only be retrieved and displayed by the Personal Electronic Book that downloaded said selections;

automatically recognize the completion of the download;

automatically disconnect said Personal Electronic Book from said on-line bookstore; and     automatically turn off said Personal Electronic Book.

10. A Personal Electronic Book System as claimed in claim 2 wherein:

said Personal Electronic Book further comprises a memory storage means for storing multimedia products;

wherein said security identification code is used to code said memory storage means to a particular Personal Electronic Book unit so that the multimedia products downloaded to and stored in said memory storage means can only be accessed by the Personal Electronic Book unit that downloaded the multimedia products from the on-line bookstore;

said Personal Electronic Book further comprising processing means, audio processing means and video processing means for displaying and playing said multimedia product.

11. A method for requesting a publication, downloading said publication and viewing said publication on the abutting touch-sensitive display screens of a Personal Electronic Book, said method comprising:

A. opening said Personal Electronic Book in the same fashion as opening a printed book; said Personal Electronic Book automatically applying power to itself and displaying facing pages of icons;

B. touching a bookstore icon to initiate communications with an on-line bookstore;

C. entering a user identification code by touching the appropriate characters on a displayed keyboard;

D. automatically dialing up said bookstore from said Personal Electronic Book and connecting via a public switched telephone network;

E. automatically establishing communications between said Personal Electronic Book and said bookstore;

F. using a security circuit in said Personal Electronic Book to automatically transmit a unique Personal Electronic Book security identification code to said bookstore;

G. verifying said security identification code by said bookstore     H. terminating communications if said security identification code is invalid;

I. automatically transmitting a user identification code entered by the user into said Personal Electronic Book to said bookstore;

J. verifying said user identification code by said bookstore;

K. terminating communications if said user identification code is invalid;

L. transmitting a welcome screen from said bookstore to said Personal Electronic Book when said codes are valid;

M. displaying said welcome screen comprised of icons representing a public domain library, an English language bookstore, a foreign languages bookstore, a multimedia bookstore, and subscription services on said Personal Electronic Book;

N. touching the icon representing the desired category of publications or services desired;

O. transmitting information representing the publication and multimedia product selections and services available from said bookstore and said Personal Electronic Book receiving and displaying said information;

P. a user's search through said publication and multimedia product selections and touching a publication or multimedia product of interest;

Q. communicating said selection from said Personal Electronic Book to said bookstore;

R. transmitting a description of selected publication or multimedia product and price information from said bookstore to said Personal Electronic Book where said information is displayed;

S. ordering said selection by user touching a confirmation icon and said Personal Electronic Book transmitting this confirming request to said bookstore;

T. downloading said selection ordered from said bookstore in compressed format and said Personal Electronic Book receiving and storing said selected publication in an updateable ROM storage device wherein the information stored in said updateable ROM is coded so that said information can only be accessed by the Personal Electronic Book unit that downloaded the information from the on-line bookstore; and automatically terminating communications with said bookstore;

U. displaying an icon representing the newly downloaded publication in addition to icons for other publications and products also stored in said updateable ROM storage device;

V. touching the icon representing the new publication and the Personal Electronic Book displaying the publication as two facing pages with printed text and graphics being displayed in their original page layout, format and color;

W. paging through the publication by user touching a right corner of the touchscreen to page ahead and touching a left corner to page backward;

X. placing a bookmark at the current page by user touching the page number and closing said Personal Electronic Book.

12. A method for selecting a publication stored in an on-line bookstore to be automatically downloaded and stored in an unattended Personal Electronic Book at a later scheduled time, said method comprising the steps claimed in claim 11 steps A through R and further comprising:

A. touching a Download Later icon on the touchscreen display of said Personal Electronic Book;

B. leaving said Personal Electronic Book connected to a telephone line wherein said telephone line is connected to said public switched telephone network;

C. automatically, without user intervention, dialing up and connecting said Personal Electronic Book to the bookstore, said Personal Electronic Book automatically identifying itself by transmitting said unique Personal Electronic Book security identification code and said user identification code;

D. downloading said selection ordered from said bookstore in compressed format and said Personal Electronic Book receiving and storing said selected publication in an updateable ROM storage device wherein the information stored in said updateable ROM is coded so that said information can only be accessed by the Personal Electronic Book unit that downloaded the information from the on-line bookstore;

G. automatically terminating communications between said Personal Electronic Book and said bookstore;

H. automatically shutting down said Personal Electronic Book unit.

13. A Personal Electronic Book as claimed in claim 1 wherein said display screens comprise left and right displays;

said left and right displays extending over virtually the entire face of each of said rectangular cases upon which said display screens are mounted.

14. A Personal Electronic Book as claimed in claim 7 wherein said software means comprise routines to display text and graphics of printed advertising in their original page layout, format and color.

15. A Personal Electronic Book as claimed in claim 7 wherein said software means comprise routines to display said publication, the covers of said publication and the overleaves of said publication in their original layout, format and color.

16. A Personal Electronic Book System as claimed in claim 10 wherein said video processing means comprise a MPEG 1 decoder to provide enhanced motion video displays or animation sequences: and wherein said audio output means comprise circuitry and software to support SoundBlaster-compatible audio with MIDI support and wavetable or FM synthesis.

17. A Personal Electronic Book System as claimed in claim 10 wherein said video processing means comprise a MPEG 2 decoder to provide enhanced motion video displays or animation sequences: and wherein said audio output means comprise circuitry and software to support SoundBlaster-compatible audio with MIDI support and wavetable or FM synthesis.

18. A Personal Electronic Book as claimed in claim 1 wherein said abutting touch-sensitive display screens display printed material over both screens as if they were a single screen thus presenting the impression of reading one full page of a magazine or a newspaper, further comprising:

a left touchscreen controller to control and monitor said left touch-screen of said abutting touchsensitive sensitive display screen;

right touchscreen controller to control and monitor said right touchscreen of said abutting touch-sensitive sensitive display screens;

a single display controller to control said left display screen and said right display screen of said abutting touch-sensitive display screens;

said display controller displaying printed matter over both displays as if they were a single display thus presenting the impression of reading from a single page.

19. A Personal Electronic Book System as claimed in claim 1 wherein said communications interface further comprises an internal cellular modem/telephone that communicates with the PSTN via two-wave wireless radio waves to a local telephone office.

20. A Personal Electronic Book System as claimed in claim 1 wherein said communications interface further comprises an internal data modem connected to a telephone jack;

said telephone jack connected via a telephone wire to a telephone outlet connected to the PSTN.

21. A Personal Electronic Book System as claimed in claim 1 wherein said communications interface further comprises a PCMCIA slot and a PCMCIA modem, said PCMCIA modem installed in said PCMCIA slot:

said PCMCIA modem connected via a telephone wire to a telephone outlet connected to the PSTN.

* * * * *